(12) United States Patent
Gilkes

(10) Patent No.: US 7,545,316 B2
(45) Date of Patent: Jun. 9, 2009

(54) APPARATUS AND METHODS TO SHARE TIME AND FREQUENCY DATA BETWEEN A HOST PROCESSOR AND A SATELLITE POSITIONING SYSTEM RECEIVER

(75) Inventor: Alan Martin Gilkes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

(21) Appl. No.: 11/112,018

(22) Filed: Apr. 22, 2005

(65) Prior Publication Data

US 2006/0238415 A1 Oct. 26, 2006

(51) Int. Cl.
*G01S 1/00* (2006.01)
(52) U.S. Cl. .............. 342/357.02; 342/357.09; 342/357.12; 342/357.15
(58) Field of Classification Search ............. 342/357, 342/357.02, 357.12, 357.15
See application file for complete search history.

(56) References Cited

U.S. PATENT DOCUMENTS

| | | | |
|---|---|---|---|
| 5,194,871 A * | 3/1993 | Counselman, III | 342/357.08 |
| 5,510,797 A * | 4/1996 | Abraham et al. | 342/352 |
| 5,841,396 A * | 11/1998 | Krasner | 342/357.02 |
| 6,483,856 B1 * | 11/2002 | Bird | 370/503 |
| 6,559,795 B1 * | 5/2003 | McBurney et al. | 342/357.12 |
| 6,683,564 B1 * | 1/2004 | McBurney | 342/357.02 |
| 6,768,452 B2 | 7/2004 | Gilkes | |
| 6,934,322 B2 * | 8/2005 | King et al. | 375/150 |
| 7,123,649 B1 * | 10/2006 | Smith et al. | 375/222 |
| 7,154,437 B2 * | 12/2006 | Bromley et al. | 342/357.12 |
| 2003/0085837 A1 * | 5/2003 | Abraham | 342/357.1 |
| 2003/0147457 A1 * | 8/2003 | King et al. | 375/148 |
| 2004/0087277 A1 * | 5/2004 | Edge et al. | 455/67.16 |
| 2004/0119639 A1 | 6/2004 | Gilkes | |
| 2004/0125822 A1 * | 7/2004 | Jun et al. | 370/503 |
| 2004/0142701 A1 * | 7/2004 | Abraham | 455/456.1 |
| 2005/0052317 A1 * | 3/2005 | McBurney et al. | 342/357.1 |
| 2005/0078032 A1 | 4/2005 | Gilkes | |

* cited by examiner

*Primary Examiner*—Thomas H Tarcza
*Assistant Examiner*—Harry Liu
(74) *Attorney, Agent, or Firm*—Ronald O. Neerings; Wade James Brady, III; Frederick J. Telecky, Jr.

(57) ABSTRACT

Methods and apparatus to share time and frequency data between a host processor and a satellite position system (SPS) receiver in a satellite positioning system are disclosed. An example method disclosed herein generates a host processor local time based on a real-time clock associated with the host processor; adjusts the host processor local time to synchronize with a SPS time received from the SPS receiver and to correct a local frequency error of the real-time clock of the host processor; calculates an estimated SPS time based on the adjusted real-time clock signal of the host processor; and attempts to fix a SPS time and a position of the SPS receiver from SPS signals received from a plurality of SPS satellites based on the estimated SPS time.

26 Claims, 5 Drawing Sheets

APPARATUS AND METHODS TO SHARE TIME AND FREQUENCY DATA BETWEEN A HOST PROCESSOR AND A SATELLITE POSITIONING SYSTEM RECEIVER

FIELD OF THE DISCLOSURE

This disclosure relates generally to Satellite Positioning Systems (SPS), and, more particularly, to apparatus and methods to share time and frequency data between a host processor and a SPS receiver.

BACKGROUND

Generally, satellite positioning systems (SPS), (e.g., the U.S. Global Positioning System (GPS) and the European Galileo System (currently under construction)), provide an invaluable service that has perhaps exceeded the imagination of the designers of the systems. For example, SPS systems are used in military, commercial, medical, scientific, and recreational applications.

When a SPS receiver is first turned on, it must be able to acquire and receive the signal transmitted from a certain number of SPS satellites before it can determine its position and the current time. For example, in the GPS system, the GPS receiver should be able to receive the transmitted signal from at least three or four GPS satellites. Each satellite in the SPS system transmits a unique signal that can be used by the SPS receiver (in conjunction with signals from other SPS satellites) to calculate the SPS receiver's position and the SPS time. One of the most vital pieces of information that is transmitted in the SPS signal is highly accurate timing information. The differences between the timing of the various SPS signals received by the SPS receiver and its own internal clock are then used to calculate the position of the SPS receiver and the current SPS time.

While SPS systems have become widely used today, there remains a major problem that hinders their use in certain situations. Since the satellites are in high-earth orbit and are typically powered by solar panels, the signals that are transmitted by the satellites are usually very weak by the time they reach the SPS receiver (signal strength being inversely proportional to distance). Additionally, SPS signals may be further attenuated by thick foliage, buildings, tunnels, etc. to a point where the SPS signals may fall below a minimum signal power threshold and become difficult or impossible for the SPS receiver to acquire and receive. Under such circumstances it may take several minutes or more to acquire the SPS signals, if acquisition is even possible.

It has been noted that if the SPS receiver can be provided with an accurate timing reference through a source other than the actual signals transmitted by the SPS satellites, the acquisition process can be accelerated or completed if it was previously unable to do so. Moreover, the more accurate the timing reference that is provided through an alternate source, the easier and faster the acquisition process becomes.

DETAILED DESCRIPTION

Figure 1:
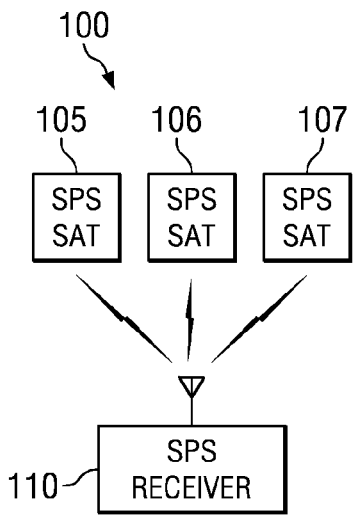
FIG. 1 is a diagram of an example prior art satellite positioning system (SPS) with a SPS receiver and a plurality of SPS satellites.

FIG. 1 is a diagram of an example prior art satellite positioning system (SPS) 100 with a SPS receiver 110 and a plurality of SPS satellites 105, 106, and 107 from which the SPS receiver 110 is capable of receiving a transmitted signal. In a SPS system, (e.g., the Global Positioning System (GPS)), the SPS receiver 110 attempts to receive a unique signal from each of several satellites (typically three or four). From this set of signals, the SPS receiver 110 is capable of determining its location and deriving an accurate SPS time.

In addition to carrying information, the signal that is transmitted from each SPS satellite is uniquely encoded so that a SPS receiver can determine the identity of the source SPS satellite from the received signal. In the GPS system, for example, each GPS satellite transmits a signal, composed from a satellite identifier and a timing reference, which a GPS receiver can detect and use to determine a timing offset between itself and the particular GPS satellite. Generally, this timing offset, when used in conjunction with at least three additional timing offsets (determined from received signals from other GPS satellites), permits the GPS receiver to accurately resolve its position (including longitude, latitude, and altitude) and the SPS time.

When a SPS receiver (for example, SPS receiver 110) is first turned on, it must acquire a requisite number of transmitted signals from different SPS satellites to resolve the SPS receiver's position and the SPS time. The acquisition process requires that the SPS receiver 110 correlate signals it is receiving with a locally generated copy of a particular signal (composed from a satellite identifier code and a local timing reference) for which the SPS receiver is searching. Correlation involves the multiplication of the locally generated copy with the received signals. A match occurs when the result of the multiplication exceeds a predetermined threshold. Correlating signals is well known to persons of ordinary skill in the art and, thus, will not be further discussed.

The correlation process is a time consuming procedure. Indeed, in some prior art SPS receivers the acquisition process may take up to several minutes or more. Some SPS receivers attempt to speed up the correlation process by using several correlators operating in parallel. The time required to perform the correlation can lengthen when one or more of the signals being received by the SPS receiver is weak. In fact, if the signal power of one of the received signals is too low (even if the signal is in fact present), the SPS receiver may not be able to acquire the requisite number of SPS satellites. As discussed previously, the signals transmitted by the SPS satellites are very weak even in ideal reception conditions, being limited by power considerations and, perhaps, governmental regulations.

Figure 2:
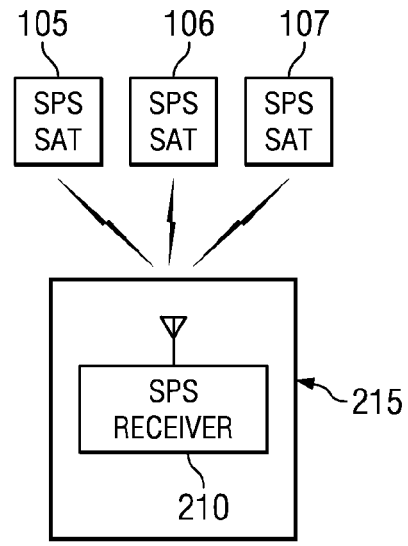
FIG. 2 shows the system of FIG. 1 operating in an environment where signals from the SPS satellites are attenuated by physical objects.

FIG. 2 illustrates the system of FIG. 1 operating in an environment that is attenuating the transmitted signals of the SPS satellites 105, 106, 107 such that the SPS receiver 110 is not able to acquire the requisite number of SPS satellite signals. For example, the signal attenuation may be the result of the SPS receiver 110 being operated under thick foliage, inside of a building such as a parking structure, inside a car that is inside a tunnel, etc. Regardless of the causes of the signal attenuation, the phenomena causing the attenuation are represented in FIG. 2 as a box 215.

When the SPS signal(s) are sufficiently attenuated, the correlations being performed by the SPS receiver 110 may never reach the predetermined threshold that signifies that the desired signal has been acquired, even though the desired signal is indeed being received at a low power level. In a best case scenario, the acquisition process is made significantly longer. In a worst case scenario, the SPS receiver 110 is not able to acquire a sufficient number of SPS satellite signals and the system is inoperable.

Perhaps the most vital piece of information provided by the SPS satellites 105, 106, 107 is accurate time information. With an accurate local time (and other ephemeris data), the SPS receiver 110 can determine the timing offset between the various SPS satellites 105, 106, 107 and its local time and, therefore, its position. Further, when provided with an accurate local time, the SPS receiver 110 can effectively narrow its search when it is performing the correlation process. For example, the SPS receiver 110 can be provided with a list of SPS satellites (e.g., satellite identification codes) from which it should be able to receive signal (composed from a satellite identifier code and a timing reference) transmissions. Combined with the accurate local time, the SPS receiver 110 knows to correlate for transmitted signals lying within a certain range of time offsets from the accurate time information provided to it, rather than having to search for transmitted signals with any time offset. This can greatly narrow the search space and expedite the acquisition process. Additionally, due to the narrowed search space, the SPS receiver 110 may be able to reduce the correlation threshold and perform a "finer" search than it would have been able to perform if it could not have reduced the search space. The manner of calculating position based on SPS signals and an accurate local time is well known in the art and, thus, will not be further discussed.

Figure 3:
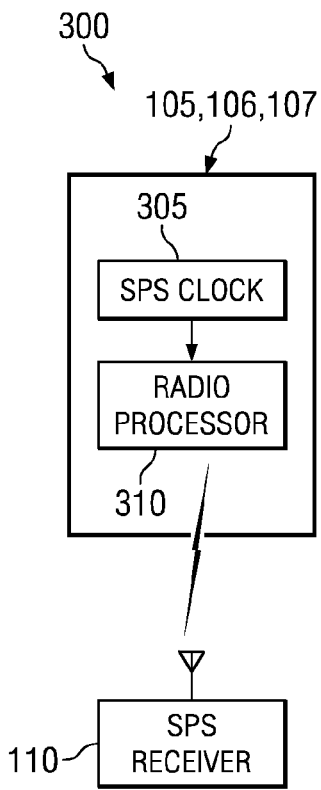
FIG. 3 is a diagram of an example prior art SPS satellite used to communicate position and time information to a SPS receiver.

FIG. 3 is a diagram of an example prior art SPS satellite 105, 106, 107 from a plurality of SPS satellites in a SPS system 300. The SPS satellite 105, 106, 107 is used to communicate position and time information to the SPS receiver 110. The SPS satellite 105, 106, 107 contains, among other things, a SPS clock 305 and a radio processor 310. The SPS clock 305 maintains a real-time clock operating on a world-wide time scale with atomic clock accuracy. The SPS clock 305 is usually referenced to a particular time, for example, microseconds elapsed since the beginning of the GPS Epoch (0000 hours, Greenwich Mean Time, 6 Jan. 1980). Since the signal transmitted by the SPS satellite 105, 106, 107 contains time information, the SPS clock 305 provides the current SPS time (T) to the radio processor 310. The radio processor 310 performs generation and transmission of SPS signals from the SPS satellite 105, 106, 107. The radio processor 310 includes all digital, analog, and RF processing associated with generating and transmitting SPS signals. Example realizations of radio processor 310 are well known to persons of ordinary skill in the art and, thus, are not further discussed. The SPS signal output by the SPS satellite 105, 106, 107 includes information that allows the SPS receiver 110 to perform a position fix (i.e., to derive the location of the SPS receiver 110 (longitude, latitude and altitude)), and to perform a determination of the SPS time, T.

Figure 4:
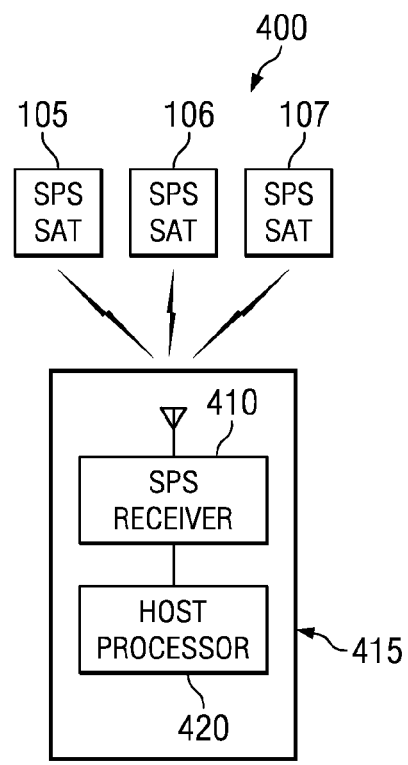
FIG. 4 is a diagram illustrating an example SPS system constructed in accordance with the teachings of the invention wherein a host processor and a SPS receiver share time and frequency data.

FIG. 4 is a diagram illustrating an example SPS system 400 constructed in accordance with the teachings of the invention. In the example of FIG. 4, an SPS receiver 410 is embedded in a receiver 415 having a host processor 420. For example, the SPS receiver 410 and the host processor 420 may be integrated into a single unit 415 (for example, a cellular telephone, a personal digital assistant (PDA), a computer, a telemetry device or implant, a medical alert bracelet, a mobile entertainment system, etc.). Alternatively, the SPS receiver 410 and the host processor 420 may be separate units that are coupled together via either a wired or wireless connection. The host processor 420 may be a general purpose microprocessor, or a dedicated device that is able to provide accurate time information to the SPS receiver 410. Thus, the host processor 420 includes a local clock. (The time provided by the local clock of the host processor 420 will be referred to herein as host processor local time (t)). To expedite the satellite acquisition process, the SPS receiver 410 is provided accurate time information by the host processor 420. As discussed above, by using an accurate local time (such as the time provided by the host processor 420) rather than deriving the local time information from signals transmitted by a plurality of SPS satellites 105, 106, and 107, the SPS receiver 410 can reduce the search space for SPS signal acquisition.

Persons of ordinary skill in the art will readily appreciate that the local clock of prior art host processors is not synchronized with the SPS time (T) at any given instant and will typically be gaining or losing time on a continuous basis because the operating frequency of the local clock will deviate from its designed frequency. Therefore, in the illustrated example, the host processor 420 shares time and frequency data with the SPS receiver 410 which enables the host processor 420 to synchronize the host processor local time (t) with the SPS time (T) obtained from the SPS satellites 105, 106, 107 and which enables the host processor 420 to accurately estimate and correct for the frequency error of the local clock of the host processor 420. As explained below, the timing information provided by the SPS receiver 410 includes the SPS time (T) and the local time of the SPS receiver 410 ($\tau$).

Figure 5:
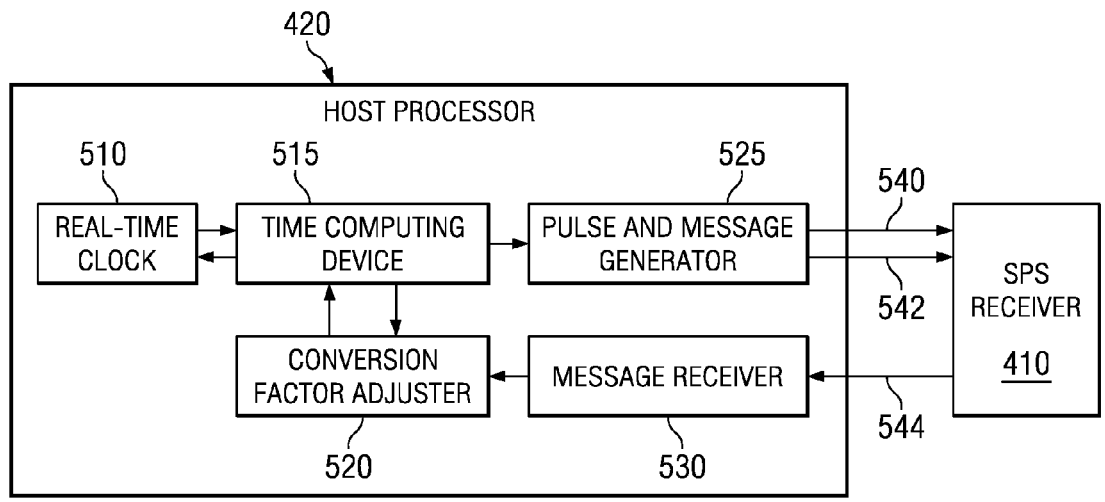
FIG. 5 is a schematic illustration of an example manner of implementing the host processor of FIG. 4.

FIG. 5 illustrates an example manner of implementing the host processor 420 of FIG. 4. In order to provide time values, the host processor 420 is provided with a real-time clock 510. In the example of FIG. 5, the RTC 510 is a readily available prior-art device that is local to the host processor 420 and is not sufficiently accurate to provide the desired level of accurate time information to the SPS receiver 410. Indeed, without further manipulation, the output of the RTC 510 will not be synchronized to the SPS time (T) and will be gaining or losing time on a continuous basis. Using well known techniques, the RTC 510 operates on one-"tick" intervals which are defined by the frequency at which the RTC 510 is designed to operate, and converts time measured in "ticks" to microseconds. This designed frequency may be represented by a scale factor ($1/C_d$) that is used to convert time measured in "ticks" of the RTC 510 to microseconds. Typically, after power-up or reset, the RTC 510 will run continuously. The current time of the RTC 510 can be initially set using any of a variety of well-known techniques. For example, through manual configuration by a user, through automatic configuration using a network time server, etc. As is described below in conjunction with FIG. 7, in the illustrated example the accuracy of the current time value provided by the RTC 510 is not crucial, and updates to the RTC 510 as the host processor 420 calculates estimates of SPS time (T) and/or shares time and frequency information with the SPS receiver 410 are not necessary.

In most electronic devices, the RTC 510 is a physical device that can be controlled by a software program. The software program can be used to, among other things, get the current time, set the current time, and start and stop the real-time clock 510.

To adjust time values provided by the RTC 510 to time values substantially more synchronized to the SPS time (T), the illustrated example includes a time computing device 515 employing a programmable scale factor ($K_{Tt}$). Typically, the programmable scale factor ($K_{Tt}$) will have a value that is slightly larger or smaller in value than $C_d$. Therefore, the best starting value for the programmable scale factor ($K_{Tt}$) is $C_d$. As is described below in conjunction with FIG. 7, the time computing device 515 uses the programmable scale factor ($K_{Tt}$) together with past actual and estimated SPS time (T) values, past host processor time (t), and SPS receiver time ($\tau$) values to compute a host processor time (t) intended to coincide with a SPS time (T).

In order to receive messages from external devices, the host processor 420 is provided with a message receiver 530. The message receiver 530 of the illustrated example receives messages sent by the SPS receiver 410 containing values representative of the times when certain events occurred in the SPS receiver 410. These values are passed to a conversion factor adjuster 520 to be used in subsequent updates of the programmable scale factor ($K_{Tt}$). The message receiver 530 may be implemented by a computer program executing on a processing element of the host processor 420 that can detect certain values on signal lines, or may be implemented by dedicated signal detection hardware.

To adjust the programmable scale factor ($K_{Tt}$) based on the time and frequency data shared with the SPS receiver 410, the host processor 420 is further provided with the conversion factor adjuster 520. In the illustrated example, the conversion factor adjuster 520 is coupled to the message receiver 530 and uses time values received from the SPS receiver 410 to update the programmable scale factor ($K_{Tt}$). Such time values may be determined each time the SPS receiver 410 receives time information from the host processor 420 and/or each time the SPS receiver 410 acquires SPS time signals. Each successive set of time values gathered by the SPS receiver 410 may be successively used by the conversion factor adjuster 420 to refine the programmable scale factor ($K_{Tt}$), such that the host processor local time (t) substantially matches and closely tracks the SPS time (T). In this way, host processor local time (t) in the illustrated example is made substantially more accurate than if the time computing device 515 had relied on a fixed scale factor based upon the designed operating frequency ($1/C_d$) of the RTC 510.

In order to generate control signals and messages used to request time information from the SPS receiver 410 and/or to provide accurate time information to the SPS receiver 410, the host processor 420 of the illustrated example is further provided with a pulse and message generator (PMG) 525. The PMG 525 may be implemented by a computer program executing on a processing element of the host processor 420 that can assert certain values on signal lines, it may alternatively be implemented by dedicated hardware that is used to generate the signals, or it may be a portion of a general purpose signal generator. In the illustrated example, the PMG 525 is configured to provide a timing pulse to the SPS receiver 410 and, at about the same time, to provide a message to the SPS receiver 410 containing a value representative of the actual time (as reflected by the output of the time computing device 515) that corresponds to the transmission of the timing pulse. The timing pulse functions as a beacon for the time that is provided to the SPS receiver 410 in the message. The timing pulse lets the SPS receiver 410 know that when it receives the pulse, the actual time is as indicated in the following message. In the illustrated example, the value in the message corresponds to the rising edge of the timing pulse. However, persons of ordinary skill in the art will appreciate that the value in the message may correspond to the falling edge of the timing pulse, or may correspond to another portion of the pulse.

It is generally more important for the PMG 525 to generate the timing pulse at substantially the intended time than for the message carrying the time of the timing pulse to be sent at a particular time. This is because the timing pulse provides the actual timing information while the message only conveys a value corresponding to the timing information carried in the timing pulse. Therefore, the degree of precision related to the timing of the message need not be as high as for the timing pulse.

In order to maintain a needed level of accuracy, the host processor 420 may periodically check and update the programmable scale factor ($K_{Tt}$) by periodically providing an estimate of the SPS time (T) to the SPS receiver 410 and requesting that a SPS time and SPS receiver location fix be attempted. The frequency of the checks should be weighed against placing too great a load on the SPS receiver 410, especially in circumstances where the SPS receiver 410 may be operating on battery power.

In the illustrated example, the PMG 525 of the host processor 420 and the SPS receiver 410 are connected via two signal lines. A first signal line 540 is used to provide the timing pulse from the PMG 525 to the SPS receiver 410. As discussed above, the timing pulse is used as a beacon to identify an instant in time that is to be identified in a subsequent message provided by the PMG 525. In the illustrated example, the message is provided over a second signal line 542. The message provided to the SPS receiver 410 over the second signal line 542 identifies a best estimate by the host processor 420 of SPS time (T) at the local time (t) when the timing pulse was transmitted. The SPS receiver 410 and the message receiver 530 of the host processor 420 are connected via a signal line 544. Messages provided to the host processor 420 by the SPS receiver 410 are carried over this signal line 544.

Figure 6:
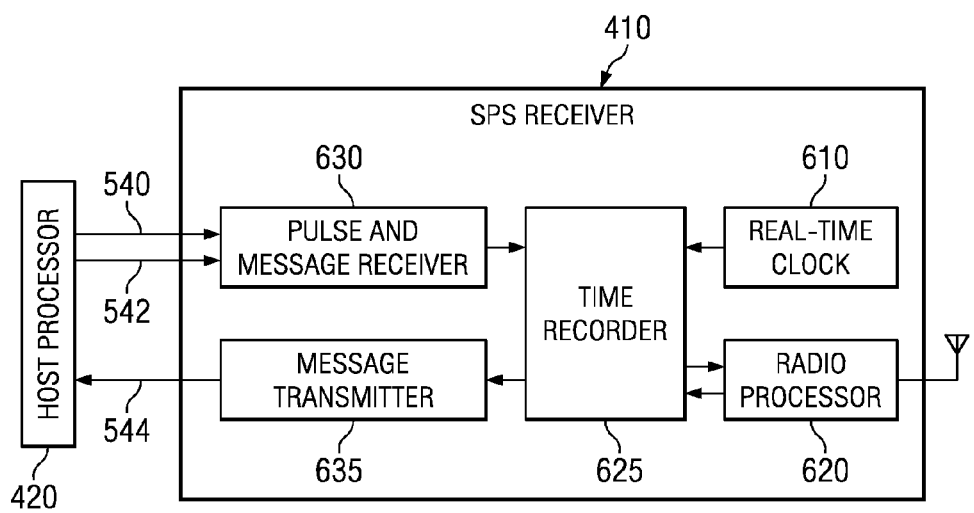
FIG. 6 is a schematic illustration of an example manner of implementing the example SPS receiver of FIG. 4.

FIG. 6 illustrates an example manner of implementing the SPS receiver 410 of FIG. 4. In order to provide a time signal, the SPS receiver 410 is provided with a real-time clock 610. In the example of FIG. 6, the RTC 610 is a readily available prior-art device that is local to the SPS receiver 410 and is not sufficiently accurate for acquisition and reception, by the SPS receiver 410, of signals from SPS satellites. Indeed, without further manipulation, the output of the RTC 610 will not be synchronized to the SPS Time (T) and will be gaining or losing time on a continuous basis. Using well known techniques, the RTC 610 operates on one-"tick" intervals as defined by the frequency at which the RTC 610 is designed to operate, and converts time measured in "ticks" to microseconds. This designed frequency of the RTC 610 may be represented by a scale factor ($1/C_s$) that is used to convert time measured in "ticks" of the RTC 610 to microseconds. If the power supplied to the SPS receiver 410 is turned off, the value of the RTC 610 remains temporarily "frozen". The current time value provided by the RTC 610 is not crucial because, in the illustrated example, the RTC 610 is used solely to determine elapsed time between two events rather than absolute time values.

In most electronic devices, the RTC 610 is a physical device that can be controlled by a software program. The software program can be used to, among other things, get the current time, set the current time, and start and stop the RTC 610.

As discussed above, without further adjusting, the RTC 610 is normally not synchronized to the SPS time (T) and is typically gaining or losing time on a continuous basis, because its actual operating frequency deviates from its designed frequency. Therefore, in the illustrated example, the SPS receiver 410 determines a local clock frequency calibration factor ($K_{cal}$) during the self-calibration procedures of the SPS receiver 410. $K_{cal}$ is a dimensionless scale factor that typically will have a value that is slightly larger or smaller than 1.0. Alternatively, if a local clock frequency calibration factor ($K_{cal}$) is not utilized and/or determined, its value can be set equal to 1.0 or simply ignored. Persons of ordinary skill in the art will readily appreciate that determination of $K_{cal}$ may be performed periodically or on a one-time basis, depending on how often the SPS receiver 410 performs self-calibration. The calibration procedures for determining $K_{cal}$ in a SPS receiver 410 are well known to persons of ordinary skill in the art. For example, $K_{cal}$ can be determined by performing two SPS receiver location and SPS time fixes, where each fix provides a pair of values of SPS local time ($\tau$) and SPS time (T). From these paired time values, an estimate of $K_{cal}$ can be expressed as $$K_{cal} = \frac{T_n - T_{n+1}}{\tau_n - \tau_{n+1}},$$

where the subscripts denote the pairing of corresponding time values.

In the illustrated example, the local clock frequency calibration factor ($K_{cal}$) is provided by the SPS receiver 410 to the host processor 420 so that the local time (t) of the host processor 420 can, via calculation, be paired with a simultaneous value of SPS time (T). If $K_{cal}$ is not provided by the SPS receiver 410, the host processor 420 may assume its value is 1.0. Alternatively, the host processor 420 may determine $K_{cal}$ based upon time information received from the SPS receiver 410 using a technique similar to that described above. Persons of ordinary skill in the art will readily appreciate that providing $K_{cal}$ to the host processor 420 by the SPS receiver 410 is performed periodically or on a one-time basis, depending on how often the SPS receiver 410 performs self-calibration. Further, if the host processor 420 is determining $K_{cal}$ it may do so once or periodically.

In order that the local time (t) of the host processor 420 can be paired with a simultaneous value of the SPS time (T), the SPS receiver 410 provides time data to the host processor 420. To gather this time data, in the illustrated example, the SPS receiver 410 is further provided with a time recorder 625. The time recorder 625 of the illustrated example records and stores values representative of the SPS receiver local times ($\tau$) corresponding to occurrences of specific events in the SPS receiver 410. For example, the time when time information is received from the host processor 420, or the time when SPS time signals are received. Further, the time recorder 625 records a value representative of the SPS time (T) as determined by the radio processor 620 and the SPS receiver local time ($\tau$) corresponding to the time when the SPS time (T) was determined.

To perform detection, acquisition and reception of SPS signals from a plurality of SPS satellites, the SPS receiver 410 is further provided with a radio processor 620. The time recorder 625 provides the radio processor 620 with the SPS receiver local time ($\tau$) and a simultaneous value of SPS time (T), for use in the acquisition and reception of SPS signals. In the illustrated example, the time recorder 625 provides a SPS receiver local time value ($\tau$) paired with the SPS time (T)) provided to the SPS receiver 410 by the host processor 420 in the message that accompanied the latest timing pulse. Further, the radio processor 620 provides back to the time recorder 625 the SPS time (T) as derived from SPS signals it acquired and received. The radio processor 620 uses the provided SPS time (T) value (rather than the SPS receiver local time ($\tau$)) to assist in acquisition and reception of SPS signals from the SPS satellites 105,106,107. Thus, it is not necessary in the illustrated example that the SPS receiver local time ($\tau$) be adjusted based upon time information provided by the host processor 420 or based on determined SPS times. Radio processor 620 includes all digital, analog, and RF processing associated with detection, acquisition and reception of the SPS signals. Example realizations of the radio processor 620 are well known to persons of ordinary skill in the art and, in the interest of brevity, will not be discussed in further detail.

In order to generate and transmit messages used to provide the time data collected by the time recorder 625 from the SPS receiver 410 to the host processor 420, the SPS receiver 410 of the illustrated example is further provided with a message transmitter 635. The message transmitter 635 may be implemented by a computer program executing on a processing element of the SPS receiver 410 that can assert certain values on signal lines, it may alternatively be implemented by dedicated hardware that is used to generate values on signal lines, or it may be a portion of a general purpose signal generator. In the illustrated example, the messages sent by the message transmitter 635 from the SPS receiver 410 to the host processor 420 contain, among other things, the SPS local clock frequency calibration factor ($K_{cal}$), a value representative of the SPS receiver local time ($\tau$) when the SPS receiver detected a timing pulse generated by the host processor 420, a value representative of the SPS receiver local time ($\tau$) when SPS time signals were received, and a value representative of the SPS time value (T) as determined by the radio processor 620.

To receive control signals and messages from external devices, the SPS receiver 410 of the illustrated example is provided with a pulse and message receiver (PMR) 630. The PMR 630 of the illustrated example receives control signals and messages transmitted by the host processor 420 to provide time information to the SPS receiver 410 and/or to request time information from the SPS receiver 410. In the illustrated example, received time information is passed to the time recorder 625 and is used to pair the SPS receiver local time ($\tau$) at the time corresponding to when the pulse was detected to the SPS time (T) contained in the accompanying message. The PMR 630 may be implemented by a computer program executing on a processing element of a SPS receiver 410 that can detect certain values on signal lines, or it may be implemented by dedicated hardware used to receive the control signals and messages, or it may be a portion of a general purpose signal receiver. In the illustrated example, the PMR 630 is configured to detect a timing pulse from the host processor 420 and, at about the same time, receive a message from the host processor 420 containing a value representative of an estimate of the SPS time (T) that corresponds to the time of transmission of the timing pulse. The timing pulse functions as a beacon for the time that is provided to the SPS receiver 410 in the message. The timing pulse lets the SPS receiver 410 know that when it receives the pulse, the time is as indicated in the following message. In the illustrated example, the value in the message corresponds to the rising edge of the timing pulse. However, persons of ordinary skill in the art will appreciate that the value in the message may correspond to the falling edge of the timing pulse, or may correspond to another portion of the pulse.

Note that it is generally more important for the PMR 630 to detect the timing pulse at substantially the intended time than to receive the message carrying the corresponding time at a particular time. This is because the timing pulse provides the actual timing information while the message only conveys a value corresponding to the timing information carried in the timing pulse. Therefore, the degree of precision related to the timing of the message need not be as high as for the timing pulse.

In the illustrated example, the host processor 420 and the PMR 630 of the SPS receiver 410 are connected via the signal lines 540 and 542. The first signal line 540 is used to provide a timing pulse from the host processor 420 to the PMR 630. As discussed above, the timing pulse is used as a beacon to identify an instant in time that is to be identified in a subsequent message provided by the host processor 420. In the illustrated example, the message is provided over the second signal line 542. The message provided by the host processor 420 over the second signal line 542 identifies an estimate by the host processor 420 of SPS time (T) at the time when the timing pulse was transmitted. The message transmitter 635 of the SPS receiver 410 and the host processor 420 are connected via the signal line 544. Messages provided to the host processor 420 by the SPS receiver 410 are carried over this signal line 544.

Figure 7:
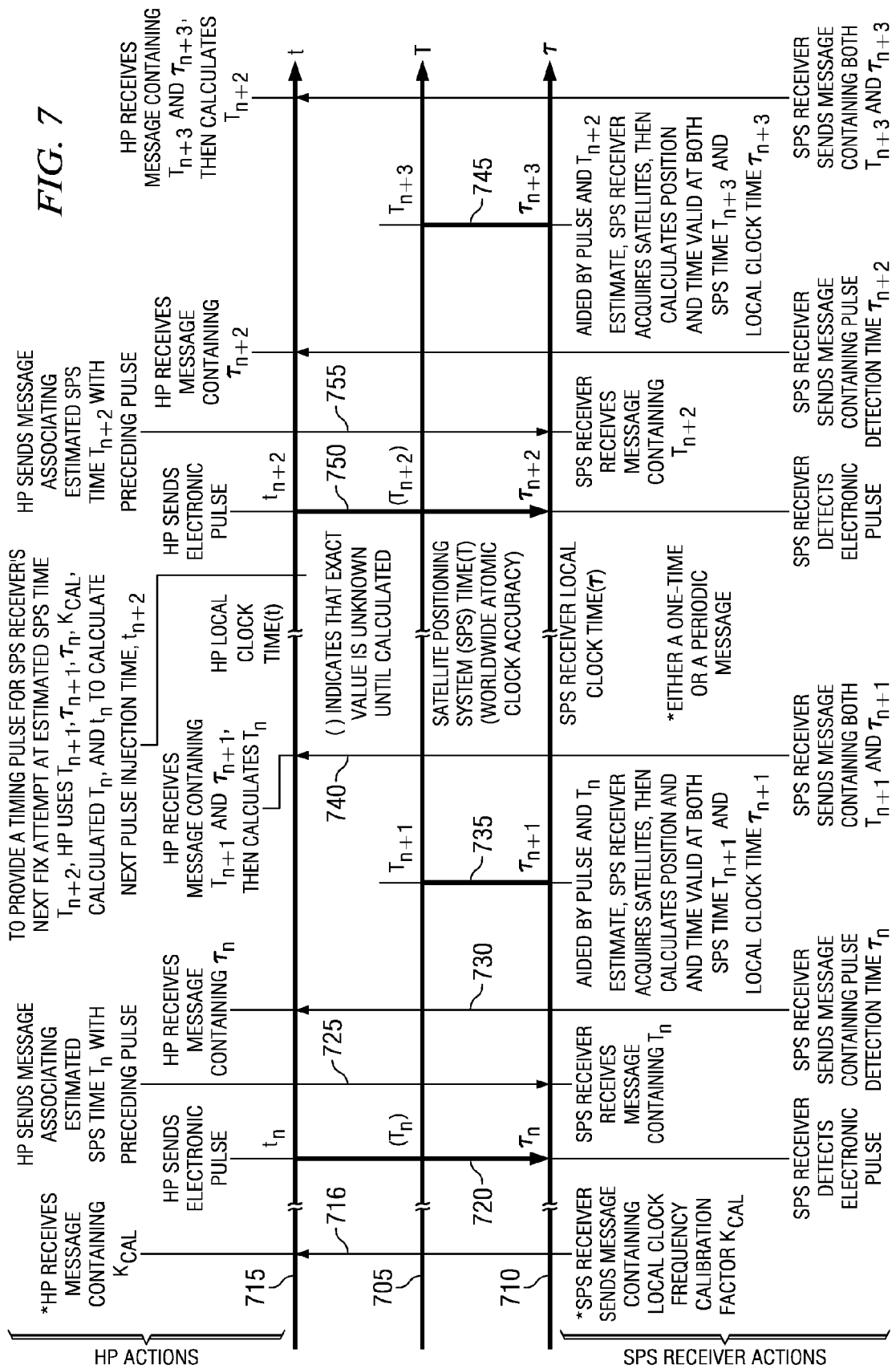
FIG. 7 is a diagram illustrating an example manner in which a host processor shares time and frequency data with a SPS receiver.

FIG. 7 is a diagram illustrating an example manner in which the host processor 420 and the SPS receiver 410 of FIG. 4 share time and frequency data. FIG. 7 illustrates a timeline of interactions between the host processor 420 and the SPS receiver 410 wherein each attempt by the SPS receiver 410 to perform a SPS receiver location fix and SPS time determination is initiated by the host processor 420. Initiations may occur based upon user request or on a predetermined schedule. Three simultaneous time scales: (a) SPS Time (T) 705, (b) SPS receiver local time ($\tau$) 710, and (c) host processor local time (t) 715 are reflected in FIG. 7. In the subsequent discussion, subscripts on the time values will indicate time at a particular instant. For example, $t_n$ is the host processor local time (t) at instant n. However, since the host processor local time (t) may not be perfectly synchronized with the SPS time (T), host processor local time ($t_n$) generally will not coincide exactly with SPS Time ($T_n$). In the illustrated example, the host processor 420 and the SPS receiver 410 cooperate to share time and frequency data so as to measure the difference (e.g., offset) between the pair of simultaneous values $t_n$ and $T_n$.

Time flows from left to right in the timeline of FIG. 7. Therefore, the example events of the timeline of FIG. 7 begin when the SPS receiver 410 sends a message 716 containing the local clock frequency calibration factor ($K_{cal}$) to the host processor 420. As discussed above, the transmission of this calibration factor may occur once after each reset or power interrupt, or may occur periodically, depending, for example, on whether the SPS receiver 410 performs the calibration once or periodically.

Two position fix attempts 720 and 750 are reflected in the example timeline of FIG. 7. The position fix attempts are initiated by the host processor 420 at host processor local times ($t_n$) and ($t_{n+2}$). The actions that are reflected at the first position fix attempt include:

(a) Based on past time measurements, the host processor 420 calculates an estimate of the current SPS time ($T_n$).

(b) The host processor 420 sends an electronic pulse 720 at time $T_n$ to the SPS receiver 410. The SPS receiver 410 receives the timing pulse, and records the SPS receiver local time ($\tau_n$) corresponding substantially to the instant the pulse was received.

(c) The host processor 420 sends a message 725 to the SPS receiver 410 containing a value representative of the estimate of the current SPS time ($T_n$).

(d) The SPS receiver 410 sends to the host processor 420 a first message 730 containing a value representative of the SPS receiver local time ($\tau_n$) reflecting substantially the time when the SPS receiver 410 detected the timing pulse. The SPS receiver local time ($\tau_n$) is based on the RTC 610 of the SPS receiver 410. The first message 730 may optionally be sent before or after the SPS receiver 410 finishes performing a SPS receiver location and SPS time determination.

(e) Using the estimate of the current SPS time ($T_n$) provided by the host processor 420, the SPS receiver 410 acquires and receives SPS time signals, and performs the SPS receiver location and SPS time determination 735.

(f) After the SPS receiver 410 has finished performing the SPS receiver location and SPS time determination 735, the SPS receiver 410 sends a second message 740 containing a value representative of the SPS receiver local time ($\tau_{n+1}$) at substantially the instant when the determination was performed and a value representative of the actual SPS time ($T_{n+1}$) as derived from the SPS signals at that same time.

The host processor 420 now has sufficient information to correct the value of SPS time ($T_n$) that it previously estimated and sent to the SPS receiver 410. This correction may be performed, for example, using the following mathematical expression:

$$T_{n,actual} = T_{n+1} + (\tau_{n+1} - \tau_n) K_{cal},$$

where $T_{n,actual}$ is the corrected value of SPS time (T) at the same instant that the pulse was transmitted by the host processor 420, $T_{n+1}$ is the SPS time (T) as derived from the SPS signals, $\tau_n$ is the local time of the SPS receiver 410 at the instant the pulse was received, $\tau_{n+1}$ is the local time of the SPS receiver 410 at the same instant that $T_{n+1}$ was derived from the SPS signals, and $K_{cal}$ is the local clock calibration factor of the SPS receiver 410.

Before the second position fix 745 is attempted, the host processor 420 uses the corrected value $T_{n,actual}$ to calculate a host processor local time ($t_{n+2}$) that is intended to coincide with the SPS Time ($T_{n+2}$). This calculated SPS Time ($T_{n+2}$) is sent to the SPS receiver 410 as accurate time assistance information using an electronic pulse 750 and a message 755. (In the calculations that follow, $K_{T_t}$ is the programmable scale factor used by the time computing device 515 to estimate host processor local time (t) based on time values provided by RTC 510, and represents the actual learned frequency of the RTC 510, rather than the designed frequency represented by $C_d$.) The estimate of the host processor local time ($t_{n+2}$) can be expressed as:

$$t_{n+2}=t_n+(T_{n+2}-T_{n,actual})K_{Tr}$$

As subsequent SPS receiver location and SPS time determinations occur, the host processor 420 reduces the error in the estimate of the SPS time (T) by continually refining its estimate of $K_{Tr}$. Refining the estimated programmable scale factor ($K_{Tr}$) is particularly valuable when: (a) intervals of minutes or hours pass between the scheduled times ($T_n$, $T_{n+2}$, etc.) for position fix attempts; or (b) whenever the SPS receiver 410 is powered down such that the RTC 610 is "frozen" during an interval of any length.

The actions performed at the second position fix attempt 745 are the same as the actions performed at the first position fix attempt, but are performed using the updated estimate of the SPS time (T) at instant n+2 (i.e., $T_{n+2}$). After the second position fix 745 a calculation is performed to correct the value of SPS time ($T_{n+2}$) that the host processor 420 estimated and sent to the SPS receiver 410:

$$T_{n+2,actual}=T_{n+3}+(\tau_{n+3}-\tau_{n+2})K_{cal}.$$

Paired time values such as ($t_n$, $T_{n,actual}$) and ($t_{n+2}$, $T_{n+2,actual}$) are the information that allows the host processor 420 to synchronize the host processor local time (t) with the SPS Time (T) at those instants.

In the illustrated manner, after the second fix 745, the host processor 420 uses $T_{n+2,actual}$ and $T_{n,actual}$ to generate a short-term estimate of host processor local clock frequency error ($e_f$) in microseconds per second or parts-per-million (ppm) by solving the following equation:

$$e_f = 1e6\left\{1 - \frac{1}{C_d}\frac{(t_{n+2}-t_n)}{(T_{n+2,actual}-T_{n,actual})}\right\}.$$

Further, to "learn" a long-term average estimate of its clock frequency error (E) the host processor 420 filters the values of $e_f$. An example filter which may be used for this purpose is a unit-energy recursive filter which is mathematically represented in the following equation:

$$E_{m+1} = \frac{(7E_m + e_f)}{8},$$

where $E_{m+1}$ is the new updated long-term average estimate of the clock frequency error (E), and $E_m$ is the previous long-term average estimate.

The host processor 420 of the illustrated example uses the latest update of E to refine its estimate of the programmable scale factor ($K_{Tr}$):

$$K_{Tr} = C_d\left[1 - \frac{E_{m+1}}{1e6}\right],$$

where $E_{m+1}$ is the current long-term average estimate of the clock frequency error (E), and $C_d$ is the scale factor that represents the designed operating frequency of the RTC 510 of the host processor 420.

In the illustrated example, the process described above is repeated as additional SPS receiver location fix attempts and SPS time determinations are performed.

The SPS receiver's need for accurate time information drives the requirement for the host processor 420 to "learn" and maintain its estimate of E (and the estimate of $K_{Tr}$ derived from it). If the SPS receiver 410 detects a timing pulse that is 250 microseconds early or late, relative to the SPS Time (T) contained in the associated message, that timing error may significantly reduce the usefulness of the pulse and message to the SPS receiver 410 in its attempt to acquire SPS signals from the SPS satellites 105, 106, 107. For example, if the actual local clock frequency error of the RTC 510 of the host processor 420 is +20 ppm, then, even if synchronized with the SPS Time (T) at some instant, the RTC 510 of the host processor 420 will gain 250 microseconds in 12.5 seconds. If, however, the host processor "learns" an estimate of the long-term average of its clock frequency error (E) equal to +20.06 ppm, then calculations of pulse times (such as $t_n$ or $t_{n+2}$) will be only 0.06 ppm in error (i.e., 250 microseconds gained or lost in 1 hour, 9 minutes, 26.667 seconds).

Although in the above example the host processor 420 initiates a SPS receiver location and a SPS time fix to be performed by the SPS receiver 410, persons of ordinary skill in the art will appreciate that a continuously operating SPS receiver 410 could alternatively periodically send pulses (followed by messages) to the host processor 420. The "1 PPS" (one pulse per second) outputs of some GPS receivers are examples of this mode of operation. In such examples, as each SPS receiver location and SPS time fix is completed, the SPS receiver 410 acquires new information about the synchronization between the SPS receiver local time (τ) and the SPS Time (T). The SPS receiver 410 can, thus, send a timing pulse to the host processor 420 at SPS receiver local time ($\tau_m$) which the host processor 420 detects at host processor local time ($t_m$). Shortly after transmitting the timing pulse, the SPS receiver 410 transmits a message associating that SPS receiver local time ($\tau_m$) with a synchronized SPS Time ($T_m$), and the host processor 420 once again has the information required to maintain synchronization of the host processor local time (t) with the SPS Time (T).

Figure 8:
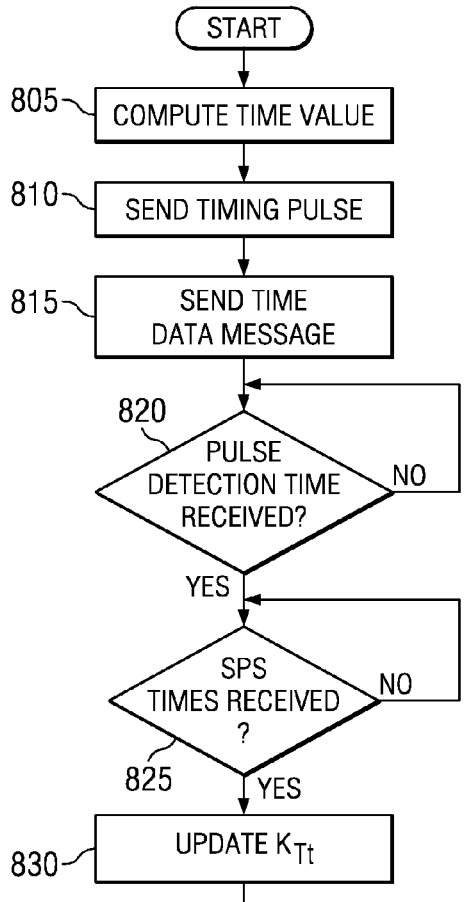
FIG. 8 is a flow chart illustrating example machine readable instructions which may executed by the host processor of FIG. 4.

A flowchart representative of example machine readable instructions which may be executed by the example host processor 420 of FIG. 5 is shown in FIG. 8. In this example, the machine readable instructions comprise a program for execution by a processor such as the processor 1312 shown in the example computer 1300 discussed below in connection with FIG. 13. The program may be embodied in software stored on a tangible medium such as a CD-ROM, a floppy disk, a hard drive, a digital versatile disk (DVD), or a memory associated with the processor 1312, but persons of ordinary skill in the art will readily appreciate that the entire program and/or parts thereof could alternatively be executed by a device other than the processor 1312 and/or embodied in firmware or dedicated hardware in a well known manner. For example, any or all of the time computing device 515, the conversion factor adjuster 520, the pulse and message generator 525, and/or message receiver 530 could be implemented by software, hardware, and/or firmware. Further, although the example program is described with reference to the flowchart illustrated in FIG. 8, persons of ordinary skill in the art will readily appreciate that many other methods of implementing the example host processor 420 may alternatively be used. For example, the order of execution of the blocks may be changed, and/or some of the blocks described may be changed, eliminated, or combined.

The program of FIG. 8 begins at block 805 where the time computing device 515 of the host processor 420 computes a host processor local time ($t_n$) that is calculated to be simultaneous with SPS time ($T_n$), using the programmable scale factor ($K_{Tr}$). After calculating $t_n$, the PMG 525 transmits a timing pulse at host processor local time $t_n$ (block 810). The PMG 525 of the host processor 420 generates and transmits a message containing a first value representative of the presumably simultaneous SPS time ($T_n$) (block 815). The message receiver 530 of the host processor 420 waits to receive a first message from the SPS receiver 410 (block 820). If the message receiver 530 receives the first message containing a second value representative of a SPS receiver local time ($\tau_n$) that corresponds to when the pulse was detected by the SPS receiver 410, control proceeds from block 820 to 825. Otherwise, control remains at block 820. A timeout may alternatively cause control to exit block 820, deliver an error message to a user, and cause the host processor 420 to stop executing the remaining machine executable instructions. The message receiver 530 of the host processor 420 waits for a second message from the SPS receiver 410 (block 825). If the message receiver 530 receives the second message containing a third value representative of the SPS receiver local time ($\tau_{n+1}$) at the time when SPS signals were received and a fourth value representative of the determined SPS time ($T_{n+1}$), control proceeds from block 825 to 830. Otherwise, control remains at block 825. A timeout may alternatively cause control to exit block 825, deliver an error message to a user, and cause the host processor 420 to stop executing the remaining machine executable instructions. The conversion factor adjuster 520 of the host processor 420 updates the short-term estimate of the host processor local clock frequency error ($e_f$), the long-term average estimate of the host processor local clock frequency error (E), and the programmable scale factor ($K_{Tr}$) based upon the received first, second, third and fourth representative values (block 830). The host processor 420 then stops executing the machine executable instructions.

In the example program, execution starts and completes once in response to a user input. Alternatively, the host processor 420 executes the example program of FIG. 8 on a pre-determined schedule.

In alternative examples, the second, third and fourth representative values received by the message receiver 530 of the host processor 420 in blocks 820 and 825 may be received in any number of messages (e.g., 1, 2, 3, etc.).

Figure 9:
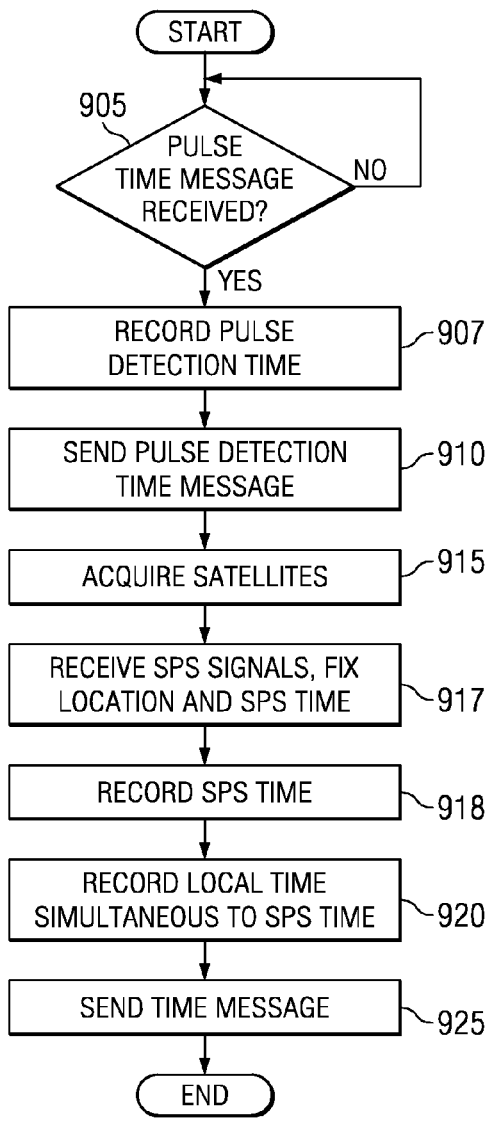
FIG. 9 is a flow chart illustrating example machine readable instructions which may executed by the SPS receiver of FIG. 4.

A flowchart representative of example machine readable instructions which may be executed by the example SPS receiver 410 of FIG. 6 is shown in FIG. 9. In this example, the machine readable instructions comprise a program for execution by a processor such as the processor 1312 shown in the example computer 1300 discussed below in connection with FIG. 13. The program may be embodied in software stored on a tangible medium such as a CD-ROM, a floppy disk, a hard drive, a digital versatile disk (DVD), or a memory associated with the processor 1312, but persons of ordinary skill in the art will readily appreciate that the entire program and/or parts thereof could alternatively be executed by a device other than the processor 1312 and/or embodied in firmware or dedicated hardware in a well known manner. For example, any or all of the time recorder 625, the pulse and message receiver 630, and/or message transmitter 635 could be implemented by software, hardware, and/or firmware. Further, although the example program is described with reference to the flowchart illustrated in FIG. 9, persons of ordinary skill in the art will readily appreciate that many other methods of implementing the example SPS receiver 410 may alternatively be used. For example, the order of execution of the blocks may be changed, and/or some of the blocks described may be changed, eliminated, or combined.

The program of FIG. 9 begins at block 905 where the pulse and message receiver 630 of the SPS receiver 410 waits to detect a timing pulse followed by reception of a message containing a first value representative of an estimate of the current SPS time ($T_n$) that corresponds to the transmission of the timing pulse from the host processor 420. If a pulse is detected, and a corresponding message is received, control proceeds from block 905 to 907. Otherwise, control remains at block 905. A timeout may alternatively cause control to exit block 905, deliver an error message to a user, and cause the SPS receiver 410 to stop executing the remaining machine executable instructions. When the pulse is detected, the time recorder 625 of the SPS receiver 410 records a second value representative of the SPS receiver local time ($\tau$) that corresponds to the time the pulse was detected (block 907). The message transmitter 635 of the SPS receiver 410 then generates and transmits a first message containing the second representative value (block 910). Using the first representative value plus the value of the elapsed time since the timing pulse was detected, the radio processor 620 of the SPS receiver 410 acquires SPS signals from a plurality of SPS satellites 105, 106, 107. The radio processor 620 may alternatively use the first representative value without adjusting for elapsed time since pulse reception (block 915). The radio processor 620 receives the SPS signals and performs a SPS receiver location and SPS time fix (block 917). The radio processor 620 provides the derived SPS time (T) to the time recorder 625 of the SPS receiver 410 which records a third value representative of the derived SPS time (T) (block 918). The time recorder 625 then records a fourth value representative of the SPS receiver local time ($\tau$) that is simultaneous with the derived SPS time (T) (block 920). Next, the message transmitter 635 of the SPS receiver 410 generates and transmits a message containing the third and fourth representative values to the host processor 420 (block 925). The SPS receiver 410 then stops executing the machine executable instructions.

In the example program of FIG. 9 the SPS receiver 410 executes once and then exits. The SPS receiver 410 is "awakened" to execute the program of FIG. 9 and then powers down to conserve battery power. Alternatively, the SPS receiver 410 may remain "awake" and ready to perform the next SPS receiver location and SPS time fix. In this alternative example, the SPS receiver returns from block 925 to 905 to await receipt of an additional pulse and message from the host processor 420.

In further examples, the second, third and fourth representative values transmitted by the message transmitter 635 of the SPS receiver 410 in blocks 910 and 925 may be transmitted in any number of messages (e.g., 1, 2, 3, etc.).

Figure 10A:
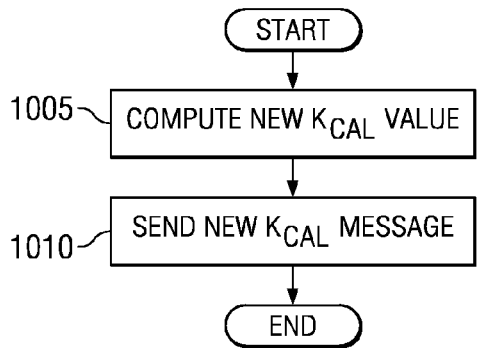
FIGS. 10a and 10b are flow charts illustrating example machine readable instructions for providing SPS receiver local clock frequency calibration information to a host processor.
Figure 10B:
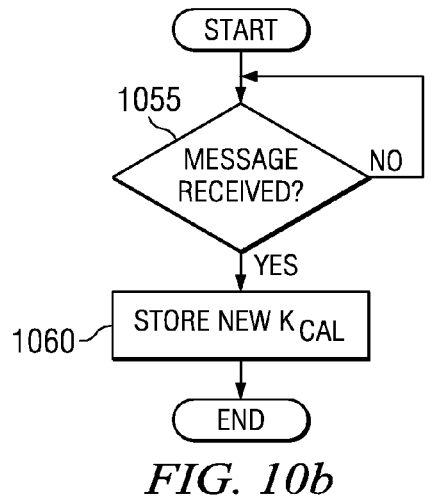

Flowcharts representative of example machine readable instructions which may be executed by the example host processor 420 of FIG. 5 and the example SPS receiver 410 of FIG. 6 are shown in FIGS. 10a-b.

The program of FIG. 10a begins at block 1005 where the SPS receiver 410 computes a new $K_{cal}$ value as part of self-calibration operations (block 1010). The message transmitter 635 of the SPS receiver 410 then generates and transmits a message to the host processor 420 containing a value representative of the new value of $K_{cal}$ (block 1010). The SPS receiver 410 then stops executing the machine executable instructions until self-calibration is performed again.

The program of FIG. 10b begins at block 1055 where the message receiver 530 of the host processor 420 waits to receive a message from the SPS receiver 410. If the message receiver 530 receives a message containing a value representative of the local clock frequency calibration factor ($K_{cal}$), control proceeds from block 1055 to 1060. Otherwise, control remains at block 1055. The message receiver 530 provides the new local clock frequency calibration factor ($K_{cal}$) to the conversion factor adjuster 520 of the host processor 420, which stores the new value for future use by the time computing device 515 of the host processor 420 (block 1060). The host processor 420 then stops executing the machine executable instructions.

Alternatively, if the host processor 420 expects to periodically receive an updated local clock frequency calibration factor ($K_{cal}$) from the SPS receiver 410, the program returns from block 1060 to block 1055.

Figure 11:
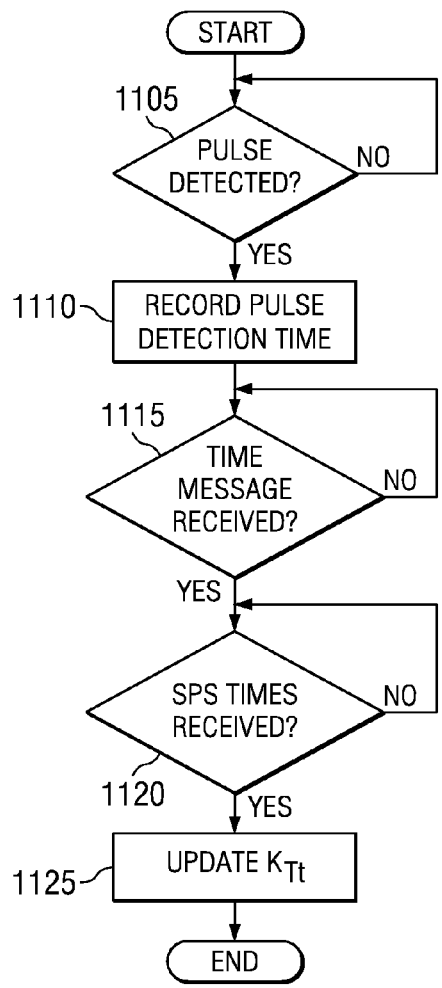
FIG. 11 is a flow chart illustrating alternative example machine readable instructions which may executed by the host processor of FIG. 4.
Figure 12:
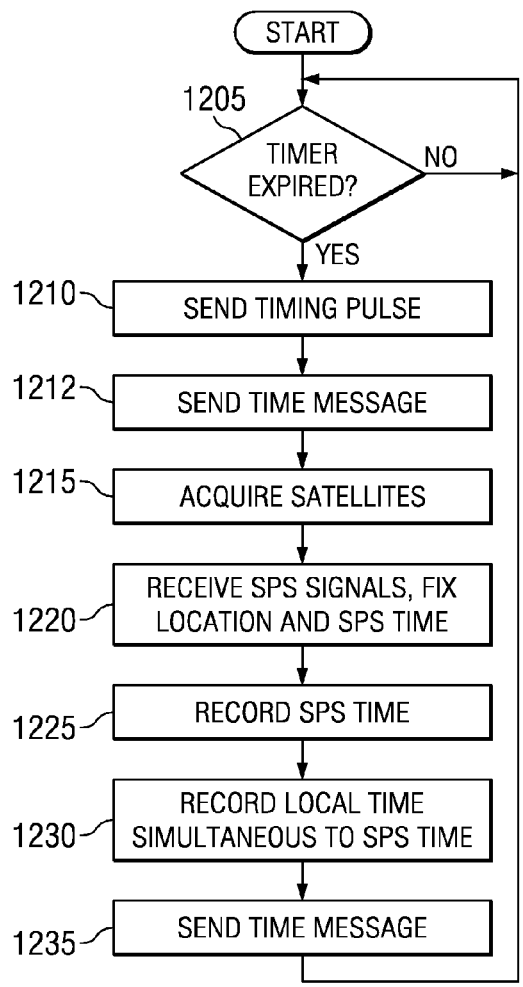
FIG. 12 is a flow chart illustrating alternative example machine readable instructions which may executed by the SPS receiver of FIG. 4.

The example machine readable instructions illustrated in the flowcharts of FIGS. 8 and 9 illustrate a manner of operation where the host processor 420 causes the SPS receiver 410 to: (a) complete a SPS receiver location and SPS time fix; and (b) to share time and frequency data with the host processor 420. FIGS. 11 and 12 show alternative flowcharts of machine readable instructions illustrating an alternative manner of operation where the SPS receiver 410 periodically performs: (a) a SPS receiver location and SPS time fix; and (b) initiates sharing time and frequency data with the host processor 420. In such an example, the SPS receiver 410 is constantly powered on and regularly updating its SPS receiver location and SPS time derivation and sharing data with the host processor 420. Alternatively, the SPS receiver 410 comprises a means to enter a low-power "sleep" mode and awakens periodically to initiate another SPS receiver location and SPS time fix; and to share data with the host processor 420.

A flowchart representative of alternative example machine readable instructions which may be executed by the example SPS receiver 410 of FIG. 6 is shown in FIG. 12. In this example, the machine readable instructions comprise a program for execution by a processor such as the processor 1312 shown in the example computer 1300 discussed below in connection with FIG. 13. The program may be embodied in software stored on a tangible medium such as a CD-ROM, a floppy disk, a hard drive, a digital versatile disk (DVD), or a memory associated with the processor 1312, but persons of ordinary skill in the art will readily appreciate that the entire program and/or parts thereof could alternatively be executed by a device other than the processor 1312 and/or embodied in firmware or dedicated hardware in a well known manner. Although the example program is described with reference to the flowchart illustrated in FIG. 12, persons of ordinary skill in the art will readily appreciate that many other methods of implementing the example SPS receiver 410 may alternatively be used. For example, the order of execution of the blocks may be changed, and/or some of the blocks described may be changed, eliminated, or combined.

The program of FIG. 12 begins at block 1205 where the SPS receiver 410 is waiting for a timer to expire. When the timer expires, control proceeds from block 1205 to 1210. Otherwise, control remains at block 1205. The message transmitter 635 of the SPS receiver 410 transmits a timing pulse and records a first value representative of the SPS receiver local time ($\tau$) that corresponds to the transmission of the timing pulse (block 1210). Following the timing pulse, the message transmitter 635 of the SPS receiver 410 generates and transmits a first message containing the first representative value (block 1212). Using the SPS receiver local time ($\tau$) the radio processor 620 of the SPS receiver 410 acquires SPS signals from a plurality of SPS satellites 105, 106, 107 (block 1215). The radio processor 620 then receives the SPS signals and performs a SPS receiver location and SPS time fix (block 1220). Then, the radio processor 620 provides the derived SPS time (T) to the time recorder 625 of the SPS receiver 410 which records a second value representative of the derived SPS time (T) (block 1225). The time recorder then records a third value representative of the SPS receiver local time ($\tau$) that is simultaneous with the derived SPS time (T) (block 1230). Then, the message transmitter 635 of the SPS receiver 410 generates and transmits a second message containing the second and third representative values (block 1235). The SPS receiver 410 then stops executing the machine executable instructions. Alternatively, the SPS receiver could use the derived SPS time (T) to "extrapolate backwards" to the SPS time at which the last pulse was originally generated by SPS receiver 410 for host processor 420 (or "extrapolate forward" to the SPS time of the next scheduled pulse). Then, the only time that the SPS receiver 410 needs to send to the host processor 420 is that SPS time corresponding to the pulse.

In alternative examples, the first, second, and third representative values transmitted in blocks 1211 and 1235 may be transmitted in any number of messages (e.g., 1, 2, 3, etc.).

A flowchart representative of alternative example machine readable instructions which may be executed by the example host processor 420 of FIG. 5 is shown in FIG. 11. In this example, the machine readable instructions comprise a program for execution by a processor such as the processor 1312 shown in the example computer 1300 discussed below in connection with FIG. 13. The program may be embodied in software stored on a tangible medium such as a CD-ROM, a floppy disk, a hard drive, a digital versatile disk (DVD), or a memory associated with the processor 1312, but persons of ordinary skill in the art will readily appreciate that the entire program and/or parts thereof could alternatively be executed by a device other than the processor 1312 and/or embodied in firmware or dedicated hardware in a well known manner. Although the example program is described with reference to the flowchart illustrated in FIG. 11, persons of ordinary skill in the art will readily appreciate that many other methods of implementing the example host processor 420 may alternatively be used. For example, the order of execution of the blocks may be changed, and/or some of the blocks described may be changed, eliminated, or combined.

The program of FIG. 11 begins at block 1105 where the message receiver 530 of the host processor 420 waits to detect a timing pulse transmitted by the SPS receiver 410. If a pulse is detected, control proceeds from block 1105 to 1110. Otherwise, control remains at block 1105. A timeout may alternatively cause control to exit block 1105, deliver an error message to a user, and cause the host processor 420 to stop executing the remaining machine executable instructions. The host processor 420 then records a first value representative of the host processor local time (t) that corresponds to the time the pulse was detected (block 1110). Then, the message receiver 530 of the host processor 420 waits to receive a first message from the SPS receiver 410 containing a second value representative of the SPS receiver local time ($\tau$) that corresponds to the transmission of the timing pulse (block 1115). If the first message is received, control proceeds from block 1115 to 1120. Otherwise, control remains at block 1115. A timeout may alternatively cause control to exit block 1115, deliver an error message to a user, and cause the host processor 420 to stop executing the remaining machine executable instructions. The message receiver 530 of the host processor 420 then waits to receive a second message from the SPS receiver 410 containing a third value representative of the SPS receiver local time ($\tau$) that corresponds to the time when the SPS signals were received and a fourth value representative of the SPS time (T) derived from the SPS signals (block 1120). If the second message is received, control proceeds from block 1120 to 1125. Otherwise, control remains at block 1120. A timeout may alternatively cause control to exit block 1120, deliver an error message to a user, and cause the host processor 420 to stop executing the remaining machine executable instructions. Then, the conversion factor adjuster 520 of the host processor 420 updates the short-term estimate of the host processor local clock frequency error ($e_f$), the long-term average estimate of the host processor local clock frequency error (E), and the programmable scale factor ($K_{Tx}$) based upon the received first, second, third and fourth representative values (block 1125). The host processor 420 then stops executing the machine executable instructions.

In alternative examples, the second, third and fourth representative values received by the message receiver 530 of the host processor 420 in blocks 1115 and 1120 may be received in any number of messages (e.g., 1, 2, 3, etc.).

Figure 13:
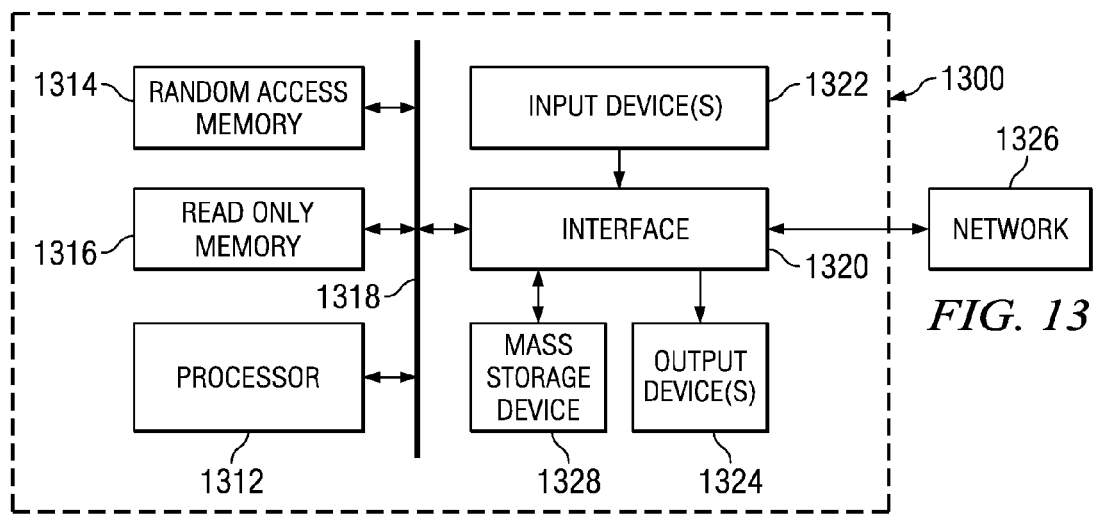
FIG. 13 is a schematic illustration of an example computer which may execute the programs of FIGS. 8, 9, 10a-b, 11 and/or 12 to implement the host processor or the SPS receiver of FIG. 4.

FIG. 13 is a block diagram of an example computer 1300 capable of implementing the apparatus and methods disclosed herein. The computer 1300 can be, for example, a cell phone, a MP3 player, a hand-help GPS unit, a server, a personal computer, a personal digital assistant (PDA), an Internet appliance, a DVD player, a CD player, a digital video recorder, a personal video recorder, a set top box, or any other type of computing device.

The system 1300 of the instant example includes a processor 1312. For example, the processor 1312 can be implemented by one or more Texas Instruments OMAP™ processors or one or more Intel® microprocessors. Of course, other processors from other families are also appropriate.

The processor 1312 is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is typically controlled by a memory controller (not shown) in a conventional manner. The processor 1312 may implement the time computing device 515 and/or the conversion factor adjuster 520 of the host processor 420.

The computer 1300 also includes a conventional interface circuit 1320. The interface circuit 1320 may be implemented by any type of well known interface standard, such as an Ethernet interface, a universal serial bus (USB), and/or a third generation input/output (3GIO) interface.

One or more input devices 1322 are connected to the interface circuit 1320. The input device(s) 1322 permit a user to enter data and commands into the processor 1312. The input device(s) can be implemented by, for example, a keyboard, a mouse, a touchscreen, a track-pad, a trackball, isopoint and/or a voice recognition system. The input devices 1322 may implement the message receiver 530 of the host processor 420 or pulse and/or the message receiver 630 of the SPS receiver 410.

One or more output devices 1324 are also connected to the interface circuit 1320. The output devices 1324 can be implemented, for example, by display devices (e.g., a liquid crystal display, a cathode ray tube display (CRT), a printer and/or speakers). The interface circuit 1320, thus, typically includes a graphics driver card. The output devices 1324 may implement the pulse and message generator 525 of the host processor 420 and/or the message transmitter 535 of the SPS receiver 410.

The interface circuit 1320 also includes a communication device such as a modem or network interface card to facilitate exchange of data with external computers via a network 1326 (e.g., an Ethernet connection, a digital subscriber line (DSL), a telephone line, coaxial cable, a cellular telephone system, etc.).

The computer 1300 also includes one or more mass storage devices 1328 for storing software and data. Examples of such mass storage devices 1328 include floppy disk drives, hard drive disks, compact disk drives and digital versatile disk (DVD) drives. The mass storage device 1328 may implement the time recorder 625 of the SPS receiver 410.

From the foregoing, persons of ordinary skill in the art will appreciate that the above disclosed methods and apparatus may be realized within a single device or across two cooperating devices, and could be implemented by software, hardware, and/or firmware to achieve improved SPS signal acquisition performance and speed by sharing time and frequency information between two processors.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A host processor in communication with a SPS receiver comprising:
    a real-time clock;
    a time computing device to estimate a SPS time based on the real-time clock;
    a conversion factor adjuster to adjust the time computing device to synchronize a time developed from the real-time clock with a SPS time received from the SPS receiver and to correct a local frequency error of the real-time clock; and
    a transmitter to transmit an electronic pulse at substantially the estimated SPS time followed by a message containing a first value representative of the estimated SPS time.

2. A host processor as defined in claim 1 wherein the host processor outputs the estimated SPS time to support a SPS receiver location and SPS time fix attempt by the SPS receiver.

3. A SPS receiver in communication with a host processor comprising:
    a receiver to receive an estimated SPS time based on a real-time clock signal of the host processor; and
    a radio processor to receive SPS signals from a plurality of satellites, wherein the radio processor attempts to derive a SPS time and SPS receiver location from SPS signals received from a plurality of SPS satellites and the estimated SPS time;
    a time recorder to record: (a) a first value representative of a local time of the SPS receiver substantially simultaneous to the estimated SPS time; (b) a second value representative of a SPS time value derived from the received SPS time signals; and (c) a third value representative of a second local time of the SPS receiver substantially simultaneous to the derived SPS time.

4. A SPS receiver as defined in claim 3 wherein the second local time of the SPS receiver is substantially the time when an electronic pulse from the host processor is received.

5. An SPS receiver as defined in claim 3 wherein the SPS receiver outputs the first, second, and third representative values to facilitate estimation of SPS times by the host processor.

6. An SPS receiver as defined in claim 3 wherein the SPS receiver calculates a local clock calibration factor and outputs the local clock calibration factor to facilitate estimation of SPS times by the host processor.

7. A SPS receiver in communication with a host processor comprising:
   a radio processor to receive SPS signals from a plurality of satellites, wherein the radio processor attempts to derive a SPS time and SPS receiver location from SPS signals received from a plurality of SPS satellites;
   wherein the SPS receiver outputs the derived SPS time to facilitate estimation of SPS times by the host processor; and
   a time recorder to record: (a) a first value representative of a first local time of the SPS receiver; (b) a second value representative of a SPS time value derived from the received SPS time signals; and (c) a third value representative of a second local time of the SPS receiver substantially simultaneous to the derived SPS time.

8. A SPS receiver as defined in claim 7 wherein the first local time of the SPS receiver is substantially the time when transmitting an electronic pulse to the host processor.

9. An SPS receiver as defined in claim 7 wherein the SPS receiver outputs the first, second, and third representative values to facilitate estimation of SPS times by the host processor.

10. An SPS receiver as defined in claim 7 wherein the SPS receiver calculates a local clock calibration factor and outputs the local clock calibration factor to facilitate estimation of SPS times by the host processor.

11. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites and the local time of the host processor; and
   using the derived SPS time to adjust a parameter associated with developing the local time of the host processor based on the real-time clock to correct a local frequency error of the real-time clock.

12. A method as defined in claim 11 further comprising:
   calculating an estimate of SPS time based on the local time of the host processor developed from the real-time clock associated with the host processor; and
   wherein deriving the SPS time and the SPS receiver location from the SPS signals received from the plurality of SPS satellites uses the estimated SPS time.

13. A method as defined in claim 11 wherein the host processor and the SPS receiver are located in a single housing.

14. A method as defined in claim 11 wherein the parameter comprises a programmable scale factor, and wherein using the derived SPS time to adjust the parameter associated with developing the first local time of the host processor based on the real-time clock to correct the local frequency error of the real-time clock comprises updating the programmable scale factor based upon a first difference between the local time of the host processor and a second local time of the host processor, and a second difference between a third local time of the SPS receiver and a fourth local time of the SPS receiver.

15. A method as defined in claim 11 further comprising:
   computing a first difference between the local time of the host processor and a second local time developed using the real-time clock associated with the host processor; and
   developing a third local time from a second real-time clock;
   computing a second difference between the third local time and a fourth local time developed from the second real-time clock;
   wherein adjusting the parameter associated with developing the local time of the host processor based on the real-time clock to correct the local frequency error of the real-time clock uses the first and second differences.

16. A method as defined in claim 15 further comprising:
   computing a fifth local time of the host processor that is substantially simultaneous to the derived SPS time based on the second difference, wherein the parameter is adjusted using the first difference and the fifth local time of the host processor.

17. A method as defined in claim 15 wherein the second real-time clock is associated with the SPS receiver.

18. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites;
   using the derived SPS time to adjust parameters associated with developing the local time of the host processor based on the real-time clock to correct a local frequency error of the real-time clock; and
   calculating an estimate of SPS time based on the local time of the host processor developed from the real-time clock associated with the host processor;
   wherein deriving the SPS time and the SPS receiver location from the SPS signals received from the plurality of SPS satellites uses the estimated SPS time;
   wherein calculating the estimate of SPS time based on the local time of the host processor developed from the real-time clock associated with the host processor comprises using a programmable scale factor; and
   wherein using the derived SPS time to adjust the parameters associated with developing the local time of the host processor based on the real-time clock to correct the local frequency error of the real-time clock comprises updating the programmable scale factor based upon a first difference between the estimated SPS time and a first local time of the SPS receiver and a second difference between a second local time of the SPS receiver and the derived SPS time.

19. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites;
   using the derived SPS time to adjust parameters associated with developing the local time of the host processor based on the real-time clock to correct a local frequency error of the real-time clock;
   calculating an estimate of SPS time based on the local time of the host processor developed from the real-time clock associated with the host processor;
   wherein deriving the SPS time and the SPS receiver location from the SPS signals received from the plurality of SPS satellites uses the estimated SPS time;
   developing a second local time from a second real-time clock;
   computing a first difference between the estimate of SPS time and the second local time; and
   computing a second difference between the derived SPS time and a third local time developed from the second local clock;
   wherein adjusting parameters associated with developing the local time of the host processor based on the real-time clock to correct a local frequency error of the real-time clock uses the first and second differences.

20. A method as defined in claim 19 wherein computing the first difference between the estimate of SPS time and the second local time comprises computing a difference between the estimate of SPS time and the second local time developed from the second local clock substantially simultaneous to the estimated SPS time; and
   wherein computing the second difference between the derived SPS time and the third local time developed from the second local clock comprises computing a difference between the derived SPS time value and the third local time developed from the second local clock substantially simultaneous to the derived SPS time.

21. A method as defined in claim 19 wherein the first real-time clock is associated with the host processor and the second real-time clock is associated with the SPS receiver.

22. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites;
   using the derived SPS time to adjust parameters associated with developing the local time of the host processor based on the real-time clock to correct a local frequency error of the real-time clock;
   calculating an estimate of SPS time based on the local time of the host processor developed from the real-time clock associated with the host processor;
   wherein deriving the SPS time and the SPS receiver location from the SPS signals received from the plurality of SPS satellites uses the estimated SPS time; and wherein the host processor and the SPS receiver are located in a single housing.

23. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites; and
   using the derived SPS time to adjust parameters associated with developing the local time of the host processor based on the real-time clock to correct a local frequency error of the real-time clock;
   wherein developing the local time based on the real-time clock associated with the host processor comprises using a programmable scale factor; and
   wherein using the derived SPS time to adjust the parameters associated with developing the first local time of the host processor based on the real-time clock to correct the local frequency error of the real-time clock comprises updating the programmable scale factor based upon a first difference between a local time of the host processor and a first local time of the SPS receiver and a second difference between a second local time of the SPS receiver and the derived SPS time.

24. A method of sharing time and frequency data between a host processor and a SPS receiver comprising:
   developing a local time of the host processor based on a real-time clock associated with the host processor;
   deriving a SPS time and SPS receiver location from SPS signals received from a plurality of SPS satellites;
   using the derived SPS time to adjust parameters associated with developing the local time of the host processor based on the real-time clock to correct a local frequency error of the real-time clock;
   developing a second local time from a second real-time clock;
   computing a first difference between a local time of the host processor and the second local time; and
   computing a second difference between the derived SPS time and a third local time developed from the second local clock;
   wherein adjusting parameters associated with developing the local time of the host processor based on the real-time clock to correct the local frequency error of the real-time clock uses the first and second differences.

25. A method as defined in claim 24 wherein computing the first difference between a local time of the host processor and the second local time comprises computing a difference between a local time of the host processor that is substantially simultaneous to the second local time; and
   wherein computing the second difference between the derived SPS time and the third local time developed from the second local clock comprises computing a difference between the derived SPS time value and the third local time developed from the second local clock substantially simultaneous to the derived SPS time.

26. A method as defined in claim 24 wherein the first real-time clock is associated with the host processor and the second real-time clock is associated with the SPS receiver.

* * * * *

UNITED STATES PATENT AND TRADEMARK OFFICE
CERTIFICATE OF CORRECTION

PATENT NO. : 7,545,316 B2
APPLICATION NO. : 11/112018
DATED : June 9, 2009
INVENTOR(S) : Alan Martin Gilkes It is certified that error appears in the above-identified patent and that said Letters Patent is hereby corrected as shown below:

Assignee has discovered two typographical errors in the subject patent.

The first error appears in the equation on column 10, line 50. $T_{n+1}$ should be followed by a "-" sign, not a "+" sign. As such, "$T_{n,actual} = T_{n+1} + (\tau_{n+1} - \tau_n)K_{cal}$", should instead be "$T_{n,actual} = T_{n+1} - (\tau_{n+1} - \tau_n)K_{cal}$".

The second error appears in the equation on column 11, line 50. $T_{n+3}$ should be followed by a "-" sign, not a "+" sign. As such, "$T_{n+2,actual} = T_{n+3} + (\tau_{n+3} - \tau_{n+2})K_{cal}$", should instead be "$T_{n+2,actual} = T_{n+3} - (\tau_{n+3} - \tau_{n+2})K_{cal}$".

Signed and Sealed this

Sixth Day of October, 2009

David J. Kappos
*Director of the United States Patent and Trademark Office*